US006330117B1

(12) United States Patent
Seo

(10) Patent No.: US 6,330,117 B1
(45) Date of Patent: Dec. 11, 2001

(54) OPTICAL ISOLATOR MODULE AND OPTICAL AMPLIFIER USING THE SAME

(75) Inventor: Man-Soo Seo, Taegu (KR)

(73) Assignee: SamSung Electronics Co., Ltd, Suwon (KR)

( * ) Notice: Subject to any disclaimer, the term of this patent is extended or adjusted under 35 U.S.C. 154(b) by 0 days.

(21) Appl. No.: 09/341,291

(22) PCT Filed: Aug. 1, 1997

(86) PCT No.: PCT/KR97/00147

§ 371 Date: Sep. 3, 1999

§ 102(e) Date: Sep. 3, 1999

(87) PCT Pub. No.: WO98/33080

PCT Pub. Date: Jul. 30, 1998

(30) Foreign Application Priority Data

Jan. 28, 1997 (KR) ..................................... 97-2393

(51) Int. Cl.[7] ..................................... G02B 15/14
(52) U.S. Cl. ..................... 359/702; 359/281; 359/337
(58) Field of Search ........................ 359/494, 341, 359/495; 372/703

(56) References Cited

U.S. PATENT DOCUMENTS

| | | | |
|---|---|---|---|
| 5,283,846 | * | 2/1994 | Toyonaka et al. ............... 385/27 |
| 5,315,431 | * | 5/1994 | Masuda et al. .................. 359/281 |
| 5,448,396 | * | 9/1995 | Fukushima ...................... 359/257 |
| 5,557,692 | * | 9/1996 | Pan et al. ........................ 385/11 |
| 5,581,640 | * | 12/1996 | Pan et al. ........................ 385/11 |
| 5,657,164 | * | 8/1997 | Shuman ........................... 359/634 |
| 5,734,762 | * | 3/1998 | Ho et al. ......................... 385/11 |
| 5,809,048 | * | 9/1998 | Shichijyo ........................ 372/32 |

FOREIGN PATENT DOCUMENTS 0 661 579 A1 * 9/1994 (EP) ..................................... G02F/1/09

* cited by examiner

*Primary Examiner*—Thomas H. Tarcza
*Assistant Examiner*—Deandra Hughes
(74) *Attorney, Agent, or Firm*—Robert E. Bushnell, Esq.

(57) ABSTRACT

An optical isolator module in which an optical splitter for splitting an optical signal input through an input port, an optical detector for detecting the separated light, and a compensator for compensating for polarization mode dispersion are integrated into a single component along with an isolator, and an optical amplifier employing the optical isolator module are disclosed.

In the optical isolator module, a first lens focuses the incident optical signal. A first birefringent device has a tapered shape in which a first incident surface forms a first predetermined angle with a first emitting surface from which a polarized light is emitted, and the incident surface of the first birefringent device is coated for partial reflection so that the portion of the incident optical signal is reflected as an reflected light. A Faraday rotator rotates polarized light by a second predetermined angle. A second birefringent device has a tapered shape in which a second emitting surface forms a second predetermined angle with a second incident surface, and an optical axis of the second birefringent device is rotated in a direction opposite to that of the rotation of light by the Faraday rotator relative to the optical axis of the first birefringent device. An optical detector, of which light-receiving surface is perpendicular to a path of the reflected light from the first incident surface of the first birefringent devices, detects the reflected light to generate a detection signal current according to the detected light. A second lens focuses a light which is transmitted through the isolator core and emitted from the second birefringent device.

22 Claims, 4 Drawing Sheets

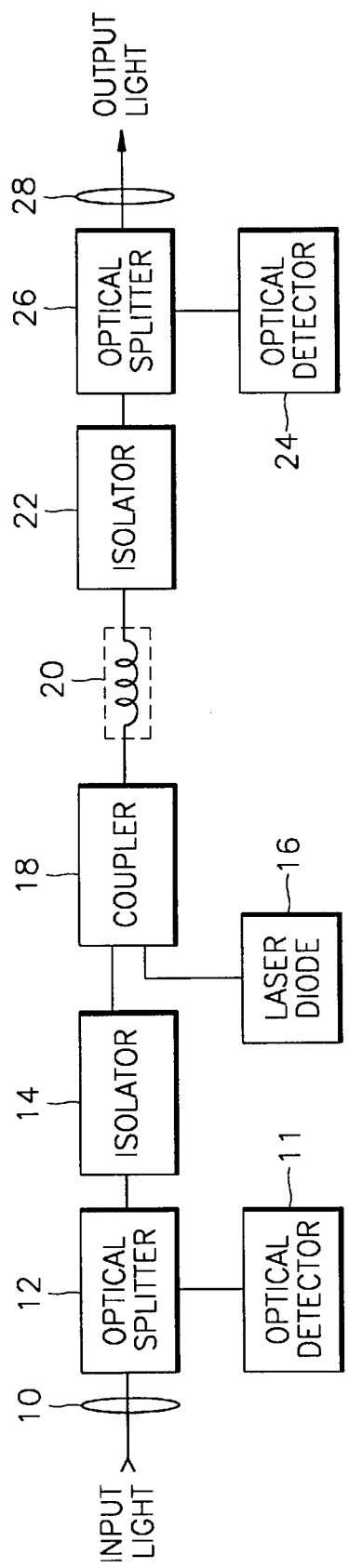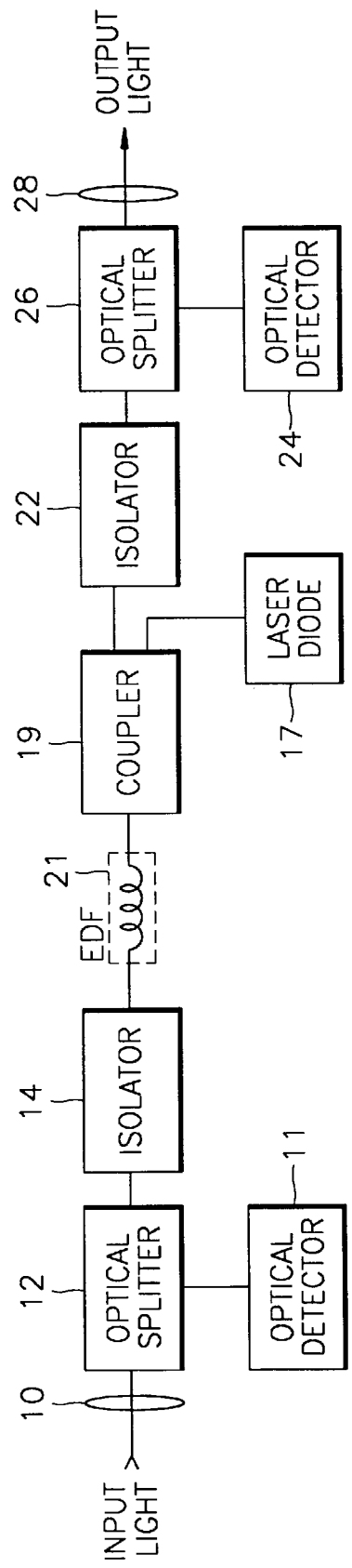

OPTICAL ISOLATOR MODULE AND OPTICAL AMPLIFIER USING THE SAME

TECHNICAL FIELD

The present invention relates to an optical isolator module and an optical amplifier using the same. More particularly, the present invention relates to an optical isolator module in which an optical splitter for separating an optical signal input through an input port, an optical detector for detecting the separated light, and a compensator for compensating for polarization mode dispersion are integrated into a single component along with an isolator. Additionally, the present invention relates to an optical amplifier using the optical isolator module.

BACKGROUND ART

An optical fiber which is used for optical communication shows a characteristics of a lower transmission loss in addition to its larger bandwidth compared with other transmission lines such as a copper wire, a coaxial cable, etc. Nevertheless, the transmission loss of the optical fiber can not be completely disregarded, and thus an optical signal which is transmitted should be periodically amplified in order to compensate for the attenuation of the signal. Such an amplification of the optical signal is performed by use of repeaters inserted between the fibers.

In most of optical communication systems currently being used, the repeater is constituted by a detector, an electrical amplifier and a semiconductor laser. In such a repeater, the detector transforms an attenuated optical signal into an electrical signal, the amplifier amplifies the transformed electrical signal, and the semiconductor laser is driven by the amplified signal to transmit a new optical signal to the next stage. However, the repeater has disadvantages in that it increases noise in the signal and the speed of transformations between the optical signal and the electrical signal are restricted by the bandwidth of components such as the detector and the amplifier.

Thus, a pure optical amplifier for amplifying an optical signal as itself has been developed and is being used. Furthermore, such an optical amplifier is used not only for optical communications but also for power amplification for a low-power optical source, signal splitting compensation in a cable TV network, or preamplification with respect to an optical detector.

The most dominating optical amplifier is an Erbium-doped fiber amplifier (hereinafter referred to as "EDFA"), which shows a high gain of 40 dB or above, a high output power, and a low noise figure in a band near 1.55 $\mu$m wavelength.

FIG. 1 is a block diagram of a typical EDFA, wherein FIG. 1a shows a forward amplifier and FIG. 1b shows a reverse amplifier.

The forward amplifier of FIG. 1a includes a first lens 10 for focusing an input light emitted from a first optical fiber (not shown), an optical detector 11 for detecting the intensity of the input light, an optical splitter 12 for coupling the optical detector 11 on a transmission path, a first isolator 14 for enabling an optical signal to flow in only forward direction, a laser diode 16 for generating an optical signal for pumping, a coupler 18 for coupling the laser diode 16 on the transmission path, an Erbium-doped fiber (hereinafter referred to as "EDF") for amplifying an input optical signal through a stimulated emission by use of photons generated by the pumping operation of the laser diode 16, a second isolator 22 for enabling the optical signal to flow only in the forward direction, an optical detector 24 for detecting the intensity of an output light, an optical splitter 26 for coupling the optical detector 24 on the transmission path, and a second lens 28 for focusing the output light to output the focused light to a second optical fiber (not shown).

In the forward amplifier having such a configuration, the EDF 20 is formed by doping the core of an optical fiber with Erbium through a modified chemical vapor deposition (CVD) method using an source gas such as Erbium trichloride ($ErCl_3$), and has an emission wavelength of 1.536 $\mu$m.

Meanwhile, the laser diode 16 generates a laser light having a wavelength of 1.48 $\mu$m or 980 nm and provides the laser light to the EDF 18. The laser light pumps electrons of Erbium to cause a distribution inversion, so that the EDF 18 outputs a laser light having a wavelength of 1.536 $\mu$m.

Of two isolators 14 and 22, the first isolator 14 prevents a degradation amplification efficiency which may results from the propagating of the light amplified in the EDF 20 or a spontaneously emitted light in the reverse direction. The second isolator 22 prevents the optical signal from being reflected by a connector (not shown) at an output port and so on and entering into the EDF 20.

The reverse amplifier of FIG. 1b has the same configuration as that of the forward amplifier of FIG. 1a except that the pumping laser diode 17 is coupled to the rear side of the EDF 21 by the coupler 19.

Meanwhile, U.S. Pat. No. 4,548,478 issued Oct. 22 1985 to Masakata Shirasaki and entitled "OPTICAL DEVICE" describes an optical isolator.

FIG. 2 illustrates the optical isolator disclosed by Shirasaki, which is employed in an optical amplifier. The optical amplifier, which is similar to that shown in FIG. 1, includes a first lens 31 for focusing an input light emitted from a first optical fiber (not shown), an optical detector 32 for detecting the intensity of the input light, an optical splitter 34 for coupling the optical detector 32 on a transmission path, an isolator 36 for enabling an optical signal to propagate only in one direction.

The optical splitter 34, which is implemented using a prism or an optical coating, separates the optical signal received therein to output some of the optical signal to the optical detector 32 and the remaining signal to the isolator 36.

The isolator 36, which was disclosed by Shirasaki, consists of two tapered plates 37 and 39 which are made of birefringent materials such as rectile and calcite and a 45° Faraday Rotator 38 interposed between the tapered plates 37 and 39.

However, the isolator 36 brings about polarization mode dispersion arising from the difference in refractive index or propagation velocity of lights. Therefore, a compensator 40 shown in FIG. 2 is additionally included to compensate for the polarization mode dispersion, which is described in European patent application published with number of 533, 398 A1 and assigned to AT&T Bell Laboratories.

Further, the conventional optical amplifier has so many components that the structure is complicated and insertion loss is large. Also, as shown in FIG. 2, optical fibers should be spliced in many places such as between the optical splitter 34 and the optical detector 32, between the optical splitter 34 and the isolator 36, between the isolator 36 and the compensator 40, etc. Consequently, the manufacturing process is complicated whereby the unit cost of a product increases Meanwhile, since the light is incident on the optical splitter at an incident angle of 45°, a large polarization dependent loss is resulted in.

DISCLOSURE OF THE INVENTION

To solve the above-described problems, one object of the present invention is to provide an isolator module which is more reliable, reveals improved optical characteristics, and reduces the unit cost of products.

Another object of the present invention is to provide a simplified optical amplifier which employs the above isolator module so that the structure thereof and the manufacturing process are simplified.

To accomplish one of the objects above, there is provided an optical isolator module for splitting and detecting a portion of an incident optical signal while controlling light to propagate only in one direction, the isolator module comprising first focusing means for focusing the incident optical signal; an isolator core including a first birefringent device which has a tapered shape in which a first incident surface forms a first predetermined angle with a first emitting surface from which a polarized light is emitted, wherein the incident surface is coated for partial reflection sot that the portion of the incident optical signal is reflected as an reflected light, a Faraday rotator for rotating polarized light by a second predetermined angle, and a second birefringent device which has a tapered shape which a second emitting surface forms a second predetermined angle with a second incident surface, wherein an optical axis of the second birefringent device is rotated in a direction opposite to that of the rotation of light by the Faraday rotator relative to the optical axis of the first birefringent device; an optical detector of which light-receiving surface is perpendicular to a path of the reflected light from the first incident surface of the first birefringent devices, for detecting the reflected light to generate a detection signal current according to the detected light; and second focusing means for focusing a light which is transmitted through the isolator core and emitted from the second birefringent device.

To accomplish another one of the objects above, there is provided an optical amplifier comprising an isolator module for splitting and detecting a portion of an incident optical signal while controlling light to propagate only in one direction pumping means for generating photons required for amplifying the incident optical signal; a special optical fiber for amplifying the incident optical signal by stimulated emission by sue of the photons generated by the pumping means to output an amplified optical signal; and coupling means for coupling the pumping means to the special optical fiber. The isolator module comprises first focusing means for focusing the incident optical signal; an isolator core including a first birefringent device which has a tapered shape in which a first incident surface forms a first predetermined angle with a first emitting surface from which a polarized light is emitted, wherein the incident surface is coated for partial reflection so that the portion of the incident optical signal is reflected as an reflected light, a Faraday rotator for rotating polarized light by a second predetermined angle, and a second birefringent device which has a tapered shape in which a second emitting surface forms a second predetermined angle with a second incident surface, wherein an optical axis of the second birefringent device is rotated in a direction opposite to that of the rotation of light by the Faraday rotator relative to the optical axis of the first birefringent device; an optical detector of which light-receiving surface is perpendicular to a path of the reflected light from the first incident surface of the first birefringent devices, for detecting the reflected light to generate a detection signal current according to the detected light; and second focusing means for focusing a light which si transmitted through the isolator core and emitted from the second birefringent device onto the optical path.

To accomplish another one of the objects above, there is further provided an optical amplifier comprising pumping means for generating photons required for amplifying an incident optical signal; a special optical fiber for amplifying the incident light signal by stimulated emission by use of the photons generated by the pumping means to output an amplified optical signal; coupling means for coupling the pumping means to the special optical fiber; and an isolator module for splitting and detecting a portion of the amplified optical signal input through the coupling means while controlling light to propagate only in one direction. The isolate module comprises first focusing means for focusing the amplified optical signal; an isolator core including a first birefringent device which has a tapered shape in which a first incident surface forms a first predetermined angle with a first emitting surface from which a polarized light is emitted, wherein the incident surface is coated for partial reflection so that the portion of the amplified optical signal is reflected as an reflected light, a Faraday rotator for rotating polarized light by a second predetermined angle, and a second birefringent device which has a tapered shape in which a second emitting surface forms a second predetermined angle with a second incident surface, wherein an optical axis of the second birefringent device is rotated in a direction opposite to that of the rotation of light by the Faraday rotator relative to the optical axis of the first birefringent device; an optical detector of which light-receiving surface is perpendicular to a path of the reflected light from the first incident surface of the first birefringent devices, for detecting the reflected light to generate a detection signal current according to the detected light; and second focusing means for focusing a light which is transmitted through the isolator core and emitted for the second birefringent device onto the optical path.

BRIEF DESCRIPTION OF THE DRAWINGS

FIG. 1 is a block diagram of a typical Erbium-doped optical amplifier (EDFA), wherein FIG. 1*a* shows a forward amplifier and FIG. 1*b* shows a reverse amplifier;

DETAILED DESCRIPTION OF THE INVENTION

Figure 2:
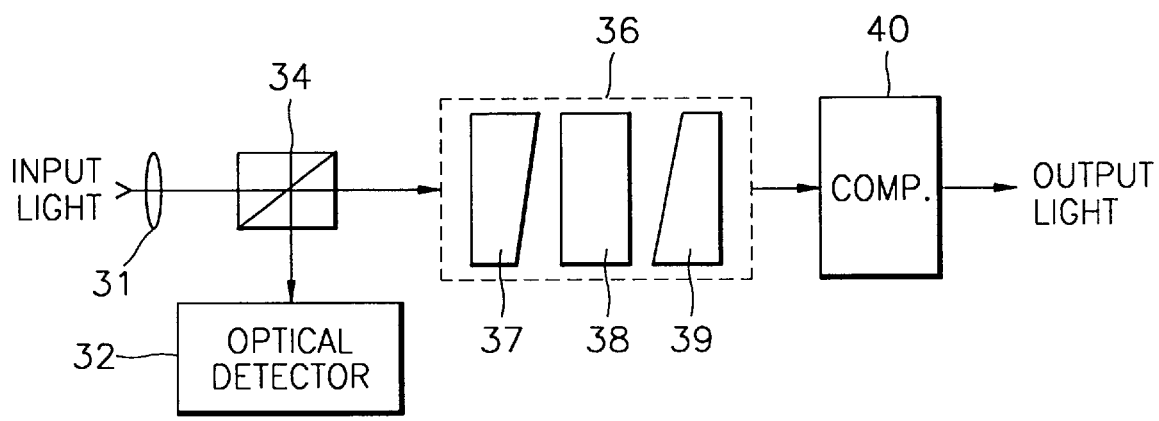
FIG. 2 illustrates a conventional optical isolator employed in an optical amplifier.
Figure 3:
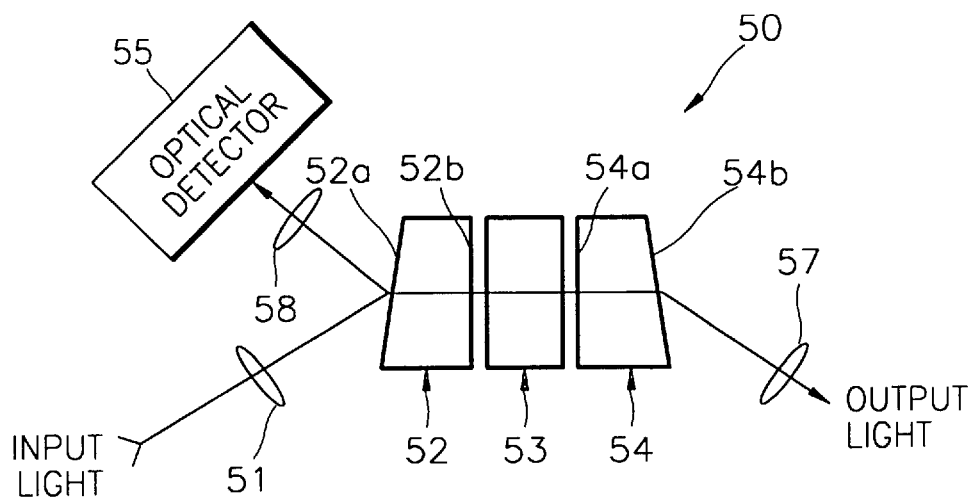
FIG. 3 is a sectional view of an isolator module according to the present invention.

Referring to FIG. 3, an isolator module 50 includes a first lens 51, an isolator core consisting of a first birefringent element 52, a Faraday rotator 53 and a second birefringent element 54, an optical detector 55 located in the direction to which a received light is reflected, a second lens 57 for focusing an output light, and a third lens 58 placed at the front of the optical detector 55.

The first lens 51 focuses the input light which is emitted from a first optical fiber (not shown) and incident on the isolator core.

Figure 4:
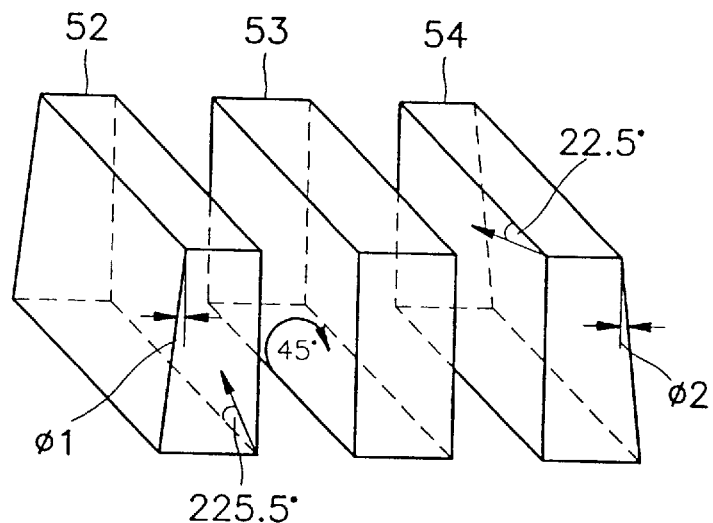
FIG. 4 is a perspective view of an isolator core in the isolator module according to the present invention.

The first birefringent element 52 of the isolator core is made of an optical anisotropic material and divides the incident light into two different refracted lights. An optical axis of the crystal consisting the first birefringent element 52 is perpendicular to the x-axis. Also, the element 52 has a tapered shape in which an incident surface 52a forms a predetermined angle $\phi_1$ with respect to an emitting surface 52b as shown in FIG. 4. Meanwhile, the incident surface 52a is partial-reflection coated so that some of the light focused by the first lens 51 and incident on the isolator core is reflected from the surface 52a.

The second birefringent element 54 has a tapered shape in which the emitting surface 54b forms a predetermined angle $\phi_2$ with respect to the incident surface 54a. Also, the optical axis of the second birefringent element 54 is rotated by 45° in a direction opposite to that light is rotated by the Faraday rotator 53 with respect to the optical axis of the first birefringent element 52.

The Faraday rotator 53 rotates double-refracted light which passes through the rotator 53 by an angle of 45°.

The optical detector 55 detects the light reflected by the incident surface 52a of the first birefringent element 52 and can be constructed by using an optical diode. Meanwhile, the third lens 58 serves to increase the detection efficiency of the optical detector 55 by focusing the light reflected by the incident surface 52a of the first birefringent element 52 on the light receiving surface of the optical detector 55.

The second lens 57 focuses the light emitted from the emitting surface 54b of the second birefringent element 54 so that most of the reflected light is gathered upon a second fiber (not shown).

Figure 5:
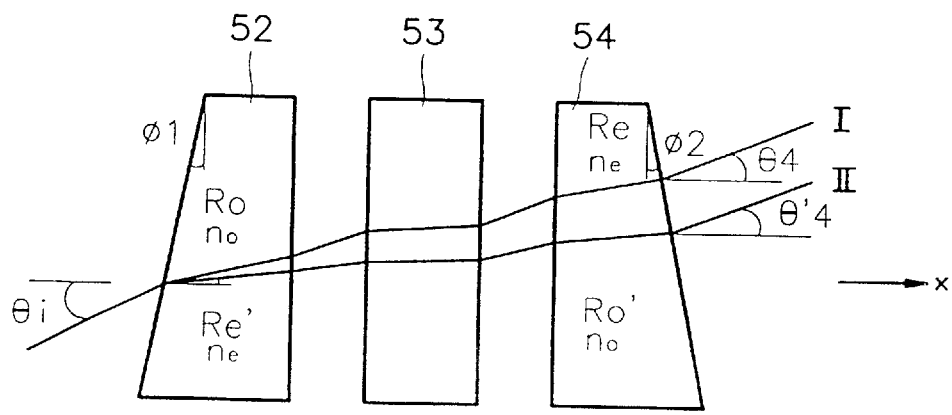
FIG. 5 illustrates an optical path along which light propagates in the forward direction in the isolator core of the isolator module according to the present invention.
Figure 6:
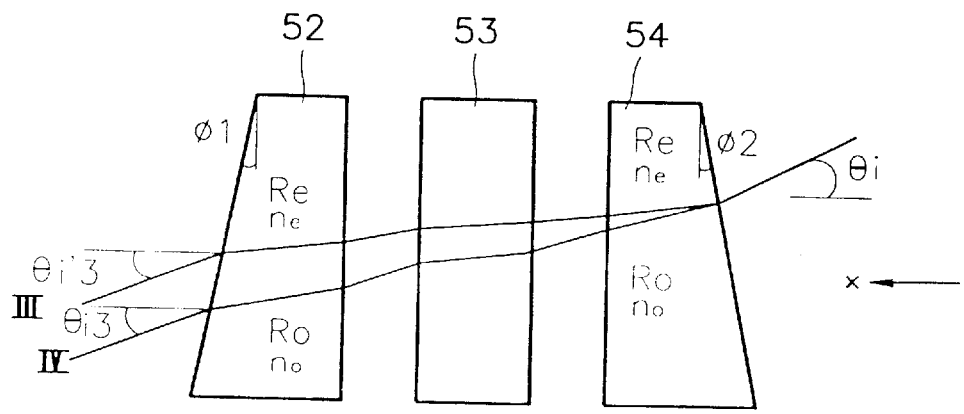
FIG. 6 illustrates an optical path along which light propagates in the reverse direction in the isolator core in the isolator module according to the present invention.

The operation of the isolator module 50 will now be described with reference to FIGS. 5 and 6. FIG. 5 illustrates an optical path along which light propagates in the forward direction in the isolator core of the isolator module according to the present invention, and FIG. 6 illustrates an optical path along which light propagates in the reverse direction in the isolator core of the isolator module according to the present invention;

First, an optical signal from a light source or an optical fiber is incident upon the incident surface 52a of the first birefringent element 52 at a predetermined angle through a focusing lens (not shown). The incident angle, which is preferably as small as possible to minimize the polarization dependent loss, is approximately 3–12° in the present embodiment.

Since the incident surface 52a of the first birefringent element 52 is partial-reflection coated, some of the light focused by the first lens 51 and incident upon the surface 52a is reflected from the incident surface 52a and detected by the optical detector 55. On the other hand, most of the incident light signals transmits the incident surface 52a to propagate into the first birefringent element 52.

As shown in FIG, 5 when light propagates in the forward direction, an ordinary ray (Ro) in the first birefringent element 52 is converted into an extra-ordinary ray (Re) in the second birefringent element 54. Similarly, an extraordinary ray (Re) in the first birefringent element 52 is converted into an ordinary ray (Ro) in the second birefringent element 54. The change of the ordinary and extraordinary rays Ro and Re is due to the fact that the direction in which the light is rotated by the Faraday rotator 53 is opposite to that in which the optical axis of the second birefringent element 54 changes with respect to the first birefringent element 52, which results in an effect of rotating the light by 90°.

In FIG. 5, a light path I denotes a path of light which is shown as a ordinary ray (Ro) in the first birefringent element 52 and as an extraordinary ray (Re) in the second birefringent element 54, and the path II denotes a path of light which is shown as an extraordinary ray (Re') in the first birefringent element 52 and as an ordinary ray (Ro') in the second birefringent element 54.

Assuming that the light is a parallel axial ray with respect to the x-axis, the relationship among $\theta_i$, $\theta_4$ and $\theta_4'$ is given by the following equation (1).

$$\theta_4 = n_o\phi_1 + n_e\phi_2 - \theta_i - \phi_1 - \phi_2$$

$$\theta'_4 = n_e\phi_1 + n_o\phi_2 - \theta_i - \phi_1 - \phi_2 \tag{1}$$

Where, $n_o$ and $n_e$ denote refractive indexes for the ordinary ray and the extraordinary ray, respectively.

If the values of $\phi_1$ and $\phi_2$ are equal to each other, the value of $\theta$ is equal to the value of $\theta 4'$ in the equation (1), which implies that the lights in the paths I and II are parallel to each other at the emitting surface 54b of the second birefringent element 54. Also, the equation (1) is reduced to the following equation (2).

$$\theta_i = (n_o + n_e - 2)\phi_1 - \phi_4 \tag{2}$$

On the other hand, as shown in FIG. 6, when light transmits in the reverse direction, the light is rotated by the Faraday rotator so that the ordinary ray Ro in the second birefringent element 54 maintains the ordinary ray Ro in the first birefringent element 52 and the extraordinary ray Re in the second birefringent element 54 maintains the extraordinary ray Re in the first birefringent element 52.

In FIG. 6, a light path III denotes a path of light which is an ordinary ray Ro in both of the first and second birefringent elements 52 and 54. Also, a path IV denotes a path of light which is an extraordinary ray Re in both of the first and second birefringent elements 52 and 54.

In this case, assuming that the light is a parallel axial ray with respect to the x-axis, the relationship among $\theta_i$, $\theta_{i3}$ and $\theta_{i3}'$ is given by the following equation (3).

$$\theta_{i3} = n_o\phi_1 + n_o\phi_2 - \theta_i - \phi_1 - \phi_2$$

$$\theta'_{i3} = n_e\phi_1 + n_e\phi_2 - \theta_i - \phi_1 - \phi_2 \tag{3}$$

If the values of $\phi_1$ and $\phi_2$ are equal to each other, the equation (3) is reduced to the following equation (4).

$$\theta_{i3} = 2(n_o - 1)\phi_1 - \theta_i$$

$$\theta'_{i3} = 2(n_e - 1)\phi_1 - \theta_i \tag{4}$$

From the equations (2) and (4), the difference between $\theta_i$ and $\theta_{i3}$ and that between $\theta_i$ and $\theta_{i3}'$ are calculated as the following equation (5)

$$\theta_i - \theta_{i3} = (n_e - n_o)\phi$$

$$\theta_i - \theta'_{i3} = (n_o - n_e)\phi \tag{5}$$

Thus, the angle $\theta_i$ of an incident light which transmits in the forward direction is different from the angles $\theta_{i3}$ and $\theta_{i3}'$ of the emitting light in the reverse direction on the incident surface 52a of the first birefringent element 52. Therefore, the light transmitting in the reverse direction cannot enter the first optical fiber while the light which emitted from the first optical fiber and transmitted in the forward direction propagates into the second optical fiber through the isolator core.

Also, when the light transmits in the forward direction, the polarization mode dispersion reduces prominently since the ordinary and extraordinary rays Ro and Re are changed in the first and second birefringent elements 52 and 54 and thus the difference in the refractive index between the first and second birefringent elements 52 and 54 which the ordinary ray Ro and the extraordinary ray Re experience is automatically compensated for. Therefore, a separate compensator is not necessary in the isolator module according to the present invention.

Figure 7:
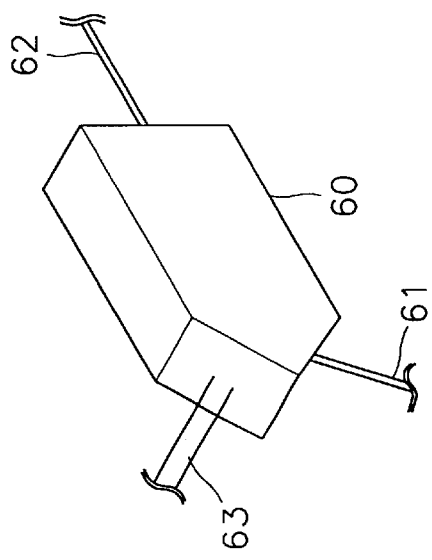
FIG. 7 is a perspective view of the isolator module according to the present invention.

FIG. 7 is a perspective view of an isolator module according to the present invention. As shown in FIG. 7, the isolator module according to the present invention can be fabricated by being molded within a single package. The molded isolator module package includes a main body 60 in which the isolator module is encapsulated, an input port 61 for receiving an input optical signal, an output port 62 for emitting the output optical signal, and a detecting signal port 63 in which a current flows whose size varies according to the optical signal detected by the photodiode.

In the main body 60, the isolator core, the first lens 51, the second lens 57, the optical detector 55 and the third lens 58 are arranged in fixed positions and sealed after calibrating the relative position therebetween, so that they cannot move relative to one another and dust or water do not permeate the isolator module.

Since the light is transmitted between the components directly rather than through optical fibers, the fibers are not needed between the isolator core and the optical detector 55. Furthermore, the number of the splicing of fibers which were required in several places in the conventional apparatus is greatly reduced.

Figure 8:
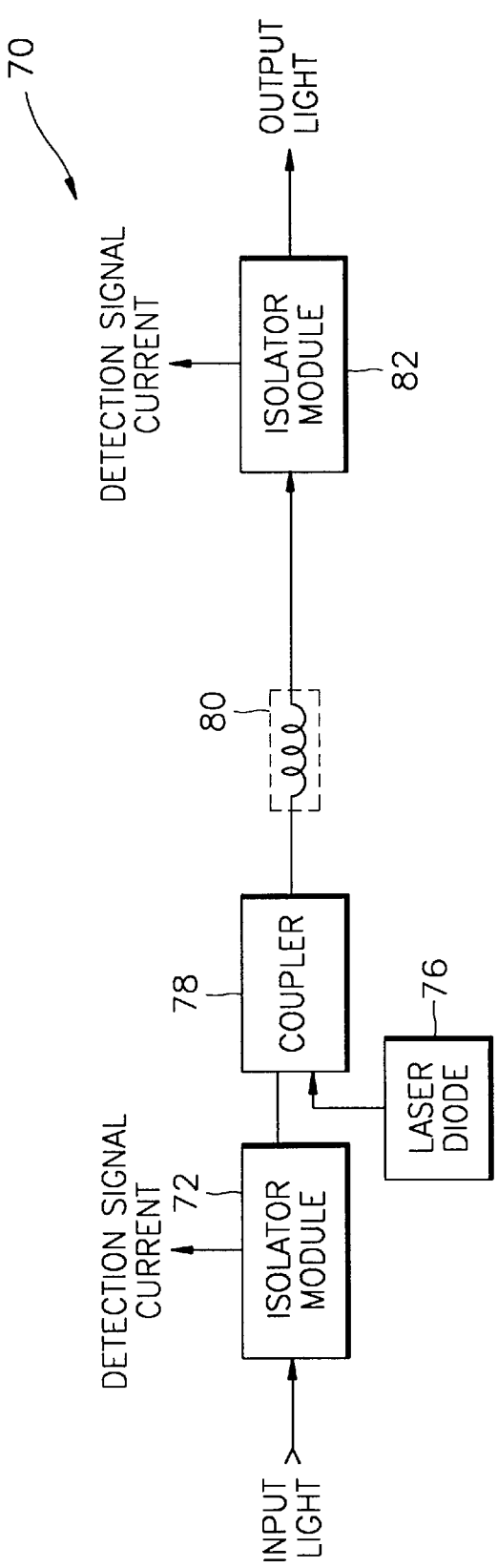
FIG. 8 is a block diagram of an embodiment of an Erbium-doped fiber amplifier (EDFA) according to the present invention.

FIG. 8 is a block diagram of an embodiment of an Erbium-doped optical amplifier (EDFA) according to the present invention.

An optical amplifier 70 includes a first isolator module 72 for splitting and detecting a portion of an incident light while enabling an optical signal to flow only in the forward direction, a laser diode 76 for generating an optical signal for pumping, a coupler 78 for coupling the laser diode 16 on an optical path, an Erbium-doped fiber (EDF) 80 for amplifying the optical signal carried by the light via the stimulated emission by use of photons generated by the pumping operation of the laser diode 76, and a second isolator module 82 for splitting and detecting a portion of the output light while enabling the optical signal to flow only in the forward direction.

The first and second isolator modules 72 and 82 are the same as those described with reference to FIGS. 3 through 7. Also, the functions and operations of the other components are the same as those in the conventional optical amplifier. Thus, the detailed description thereof will be omitted.

As shown in FIG. 8, the first and second isolator modules 72 and 82 detect the intensity of the light by themselves and output detection currents which are proportional to the input and output lights, respectively, while limiting the light to flow only in one direction.

In an alternative of the present embodiment, any one of the first and second isolator modules may be omitted. Also, a plurality of isolator cores can be used by being connected to each other in series in order to enhance the optical characteristics.

In a further alternative of the present embodiment, the laser diode can carry out pumping operation in the rear side of the EDF rather than in the front side thereof.

Therefore, it should be noted that the description of the embodiments were described to merely illustrate the isolator module and the optical amplifier according to the present invention and the scope of the present invention is not limited to the particular isolator module and the optical amplifier which were illustrated.

INDUSTRIAL APPLICABILITY

The optical isolator module according to the present invention can be employed for an optical amplifier and other applications in which light is desired to be propagated in one direction. Also, the optical amplifier according to the present invention is used for power amplification of low-power light source, the compensation for the signal splitting in a cable TV network, or preamplification for an optical detector, as well as optical communications.

Meanwhile, according to the isolator module and the optical amplifier of the present invention as described above, the number of components is reduced and the structure thereof is simplified since an optical splitter for splitting an optical signal and a compensator for compensating polarization mode dispersion is merged into the isolator module, and an optical detector for detecting the split light is integrated into a single package along with an isolator. Further, an insertion loss is decreased due to the reduction of the number of components.

Also, since the light is transmitted between the components directly rather than through optical fibers, the number of the splicing points of optical fibers decreases, the manufacturing process is simplified and the unit cost of product is lowered.

Furthermore, since an incident light is incident upon the optical splitter at a small incident angle, the polarization dependent loss is reduced.

Therefore, the optical characteristics of the isolator module and the optical amplifier are improved, so that reliability of the product is enhanced.

What is claimed is:

1. An optical isolator module for splitting and detecting a portion of an incident optical signal while controlling light to propagate only in one direction, said optical isolator module comprising:

first focusing means for focusing the incident optical signal;

an isolator core including
a first birefringent device which has a tapered shape in which a first incident surface forms a first predetermined angle with a first emitting surface from which a polarized light is emitted, wherein the incident surface is coated for partial reflection so that the portion of the incident optical signal is reflected as reflected light along a path different from a path of the incident optical signal,
a Faraday rotator for rotating the emitted polarized light by a second predetermined angle, and
a second birefringent device which has a tapered shape in which a second emitting surface forms a third predetermined angle with a second incident surface, wherein an optical axis of said second birefringent device is rotated in a direction opposite to that of the rotation of light by said Faraday rotator relative to an optical axis of said first birefringent device;

an optical detector having a light-receiving surface, which is perpendicular to a path of the reflected light from said first incident surface of said first birefringent device, for detecting the reflected light to generate a detection signal current according to the detected light; and second focusing means for focusing a light which is transmitted through said isolator core and emitted from said second birefringent device.

2. An optical isolator module as claimed in claim 1 wherein the second predetermined angle is 45°.

3. An optical isolator module as claimed in claim 1, wherein a focused light from said fist focusing means is incident on said first incident surface of said first birefringent device at an incident angle of 3–12°.

4. An optical isolator module as claimed in claim 1, wherein said first focusing means, said isolator core, said optical detector and said second focusing means are arranged in fixed positions and sealed in a package.

5. An optical isolator module as claimed in claim 1, further comprising a third focusing means for focusing the reflected light onto said light-receiving surface of said optical detector.

6. An optical isolator module as claimed in claim 5, wherein said first focusing means, said isolator core, said optical detector, said second focusing means and said third focusing means are arranged infixed positions and sealed in a package.

7. An optical amplifier, comprising:
an isolator module for splitting and detecting a portion of an incident optical signal while controlling a remainder of the incident optical signal to propagate only in one direction;
pumping means for generating photons required for amplifying the remainder of the incident optical signal;
a special optical fiber for amplifying the remainder of the incident optical signal by stimulated emission by use of the photons generated by said pumping means to output an amplified optical signal; and
coupling means for coupling said pumping means and said isolator module to a front end of said special optical fiber;
wherein said isolator module comprises:
first focusing means for focusing the incident optical signal;
an isolator core including
a first birefringent device which has a tapered shape in which a first incident surface forms a first predetermined angle with a first emitting surface from which a polarized light is emitted, wherein the incident surface is coated for partial reflection so that the portion of the incident optical signal is reflected as reflected light along a path different from a path of the incident optical signal,
a Faraday rotator for rotating the emitted polarized light by a second predetermined angle, and
a second birefringent device which has a tapered shape in which a second emitting surface forms a third predetermined angle with a second incident surface, wherein an optical axis of said second birefringent device is rotated in a direction opposite to that of the rotation of light by said Faraday rotator relative to the optical axis of said first birefringent device;
an optical detector having a light-receiving surface, which is perpendicular to a path of the reflected light from said first incident surface of said first birefringent device, for detecting the reflected light to generate a detection signal current according to the detected light; and
second focusing means for focusing a light which is transmitted through said isolator core and emitted from said second birefringent device.

8. An optical amplifier as claimed in claim 7, wherein said special optical fiber si doped with a rare earth element.

9. An optical amplifier as claimed in claim 8, wherein said special optical fiber is an Erbium-doped optical fiber.

10. An isolator module as claimed in claim 7, wherein the second predetermined angle is 45°.

11. An isolator module as claimed in claim 7, wherein a focused light from said first focusing means is incident on said first incident surface of said first birefringent device at an incident angle of 3–12°.

12. An isolator module as claimed in claim 7, wherein said first focusing means said isolator core, said optical detector and said second focusing means are arranged in fixed positions and sealed in a package.

13. An isolator module as claimed in claim 7, further comprising a third focusing means for focusing the reflected light onto said light-receiving surface of said optical detector.

14. An isolator module as claimed in claim 13, wherein said first focusing means, said isolator core, said optical detector, said second focusing means and said third focusing means are arranged in fixed positions and sealed in a package.

15. An optical amplifier, comprising:
pumping means for generating photons required for amplifying an incident optical signal;
a special optical fiber for amplifying the incident optical signal by stimulated emission by use of the photons generated by said pumping means to output an amplified optical signal;
coupling means for coupling said incident optical signal and said pumping means to a front end of said special optical fiber; and
an isolator module for splitting the amplified optical signal input through said coupling means and reflecting a portion of the amplified optical signal input through said coupling means while controlling a remainder of the amplified optical signal to propagate only in one direction;
wherein said isolator module comprises: p2 first focusing means for focusing the amplified optical signal;
an isolator core including
a first birefringent device which has a tapered shape in which a first incident surface forms a first predetermined angle with a first emitting surface from which a polarized light is emitted, wherein the first incident surface is coated for partial reflection so that the portion of the amplified optical signal is reflected as reflected light along a path different from a path of the incident optical signal,
a Faraday rotator for rotating the emitted polarized light by a second predetermined angle, and
a second birefringent device which has a tapered shape in which a second emitting surface forms a third predetermined angle with a second incident surface, wherein an optical axis of said second birefringent device is rotated in a direction opposite to that of the rotation of light by said Faraday rotator relative to the optical axis of said first birefringent device;

an optical detector having a light-receiving surface, which is perpendicular to a path of the reflected light from said first incident surface of said first birefringent device, for detecting the reflected light to generate a detection signal current according to the detected light; and second focusing means for focusing a light which is transmitted through said isolator core and emitted from said second birefringent device.

16. An optical amplifier as claimed in claim 15, wherein said special optical fiber is doped with rare earth element.

17. An optical amplifier as claimed in claim 16, wherein said special optical fiber is an Erbium-doped optical fiber.

18. An isolator module as claimed in claim 15, wherein the second predetermined angle is 45°.

19. An isolator module as claimed in claim 15, wherein a focused light from said first focusing means is incident on said first incident surface of said first birefringent device at an incident angle of 3–12°.

20. An isolator module as claimed in claim 15, wherein said first focusing means, said isolator core, said optical detector and said second focusing means are arranged in fixed positions and sealed in a package.

21. An isolator module as claimed in claim 15, further comprising a third focusing means for focusing the reflected light onto said light-receiving surface of said optical detector.

22. An isolator module as claimed in claim 15, wherein said first focusing means, said isolator core, said optical detector, said second focusing means and said third focusing means are arranged in fixed positions and sealed in a package.

* * * * *